(12) United States Patent
Cherolis et al.

(10) Patent No.: US 10,215,098 B2
(45) Date of Patent: Feb. 26, 2019

(54) BEARING COMPARTMENT SEAL (71) Applicant: United Technologies Corporation, Hartford, CT (US)

(72) Inventors: Anthony P. Cherolis, Hartford, CT (US); Jorge I. Farah, Hartford, CT (US); Seth A. Max, Prospect, CT (US); John H. Mosley, Portland, CT (US); Steven D. Porter, Wethersfield, CT (US); Gregory E. Reinhardt, South Glastonbury, CT (US); Kevin Zacchera, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 884 days.

(21) Appl. No.: 14/603,088

(22) Filed: Jan. 22, 2015

(65) Prior Publication Data

US 2016/0215702 A1 Jul. 28, 2016

(51) Int. Cl.
*F02C 7/06* (2006.01)
*F02C 7/28* (2006.01)
*F01D 11/00* (2006.01)
*F01D 25/16* (2006.01)
*F16J 15/06* (2006.01)
*F01D 25/12* (2006.01)
*F02C 3/14* (2006.01)

(52) U.S. Cl.
CPC .............. *F02C 7/28* (2013.01); *F01D 11/005* (2013.01); *F01D 25/125* (2013.01); *F01D 25/162* (2013.01); *F02C 3/14* (2013.01); *F02C 7/06* (2013.01); *F16J 15/06* (2013.01); *F05D 2220/32* (2013.01); *F05D 2230/60* (2013.01); *F05D 2240/55* (2013.01); *Y02T 50/675* (2013.01)

(58) Field of Classification Search
CPC ...... F01D 25/16–25/168; F01D 25/183; F01D 25/125; F01D 11/005; F02C 7/28; F02C 7/125; F02C 7/06; F05D 2240/55; F05D 2240/58; F05D 2240/581; F05D 2240/50
See application file for complete search history.

(56) References Cited

U.S. PATENT DOCUMENTS

| 3,527,054 A | 9/1970 | Hemsworth |
| 3,915,521 A | 10/1975 | Young |
| 4,321,007 A | 3/1982 | Dennison et al. |

(Continued)

FOREIGN PATENT DOCUMENTS

| EP | 2479406 A2 | 7/2012 |
| GB | 2152148 A | 7/1985 |

(Continued)

OTHER PUBLICATIONS

Extended European Search Report for EP Application No. 16152299.0, dated May 24, 2016, 7 pages.

*Primary Examiner* — Laert Dounis
(74) *Attorney, Agent, or Firm* — Kinney & Lange, P.A.

(57) ABSTRACT

A sealing arrangement includes a turbine static structure with a seal ring having groove with a contact surface. Also included is a bearing compartment with a second contact surface, and a piston seal positioned between the turbine static structure and the bearing compartment. The piston seal includes sides configured to contact the contact surfaces and is positioned in the groove.

17 Claims, 7 Drawing Sheets

(56) References Cited

U.S. PATENT DOCUMENTS

| | | |
|---|---|---|
| 4,369,016 A | 1/1983 | Dennison |
| 4,384,822 A | 5/1983 | Schweikl et al. |
| 4,406,459 A | 9/1983 | Davis et al. |
| 4,438,939 A | 3/1984 | Pask et al. |
| 4,561,246 A | 12/1985 | Hovan |
| 5,622,438 A | 4/1997 | Walsh et al. |
| 6,076,835 A | 6/2000 | Ress et al. |
| 6,131,914 A | 10/2000 | Proveaux |
| 6,916,154 B2 | 7/2005 | Synnott |
| 7,946,590 B2 | 5/2011 | Dobek et al. |
| 7,984,911 B2 | 7/2011 | Dobek et al. |
| 8,210,316 B2 | 7/2012 | DiBenedetto et al. |
| 8,366,382 B1 | 2/2013 | Muldoon et al. |
| 2007/0052179 A1* | 3/2007 | Snowsill .......... F16J 15/442 277/543 |
| 2010/0132372 A1* | 6/2010 | Durocher .......... F01D 9/065 60/796 |
| 2010/0135770 A1 | 6/2010 | Durocher et al. |
| 2011/0079019 A1 | 4/2011 | Durocher et al. |
| 2011/0079020 A1* | 4/2011 | Durocher .......... F01D 11/18 60/799 |
| 2012/0195741 A1 | 8/2012 | Sarawate et al. |
| 2013/0019225 A1 | 1/2013 | Peters et al. |
| 2013/0069313 A1* | 3/2013 | Sonokawa .......... F01D 11/003 277/300 |
| 2013/0192250 A1 | 8/2013 | Glahn et al. |
| 2013/0192261 A1 | 8/2013 | Mayer et al. |
| 2013/0309078 A1 | 11/2013 | Vo et al. |
| 2013/0323045 A1 | 12/2013 | Porter et al. |
| 2013/0323046 A1 | 12/2013 | Gordon et al. |
| 2014/0010649 A1 | 1/2014 | Farah et al. |
| 2014/0056685 A1 | 2/2014 | Duelm et al. |
| 2014/0091535 A1* | 4/2014 | Cusack .......... F16J 15/3284 277/641 |
| 2014/0140824 A1 | 5/2014 | Sheridan |
| 2014/0286599 A1 | 9/2014 | Devitt et al. |
| 2014/0290269 A1 | 10/2014 | Lefevre et al. |
| 2014/0300058 A1 | 10/2014 | Brunet et al. |
| 2016/0130967 A1* | 5/2016 | Kelly .......... F01D 11/003 415/174.5 |
| 2016/0215638 A1* | 7/2016 | Porter .......... F01D 11/005 |
| 2016/0215639 A1* | 7/2016 | Porter .......... F01D 11/005 |

FOREIGN PATENT DOCUMENTS

| | | |
|---|---|---|
| WO | 2014051691 A1 | 4/2014 |
| WO | 2014138617 A1 | 9/2014 |
| WO | 2014152123 A1 | 9/2014 |
| WO | WO2014/172130 A1 | 10/2014 |
| WO | WO2014/210496 A1 | 12/2014 |

\* cited by examiner

FIG. 7

BEARING COMPARTMENT SEAL

CROSS-REFERENCE TO RELATED APPLICATIONS

Reference is made to U.S. patent application Ser. No. 14/603,033 entitled "SEAL WITH BACKUP SEAL" and U.S. patent application Ser. No. 14/603,126 entitled "FLANGE TRAPPED SEAL CONFIGURATION", which are filed on even date by the same applicant and are assigned to the same assignee as this application.

BACKGROUND

The present invention relates generally to gas turbine engines, and more particularly to a seal arrangement of a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Both the high and low pressure spools include alternating cascades of stators and rotors in order to work on the primary fluid in the flow path. Because the stators are stationary but the rotors rotate, bearings are necessary to permit the relative motion. Bearings can be situated in bearing compartments that provide oil to the moving parts for lubrication.

The combustion system heats the primary fluid in the flow path to very high temperatures, so both the high and low pressure turbines utilize cooling air from the high and/or low pressure compressors. This cooling air can be fed into a bearing compartment in order to cool and purge the bearing compartment of any stray oil that has leaked out. Because the boundaries of the bearing compartment can be formed by several components, seal arrangements are utilized between the components to control fluid flow.

SUMMARY

According to one embodiment of the present invention, a sealing arrangement includes a turbine static structure with a seal ring having groove with a contact surface. Also included is a bearing compartment with a second contact surface, and a piston seal positioned between the turbine static structure and the bearing compartment. The piston seal includes sides configured to contact the contact surfaces and is positioned in the groove.

In another embodiment, a method of assembling a gas turbine engine includes connecting a bearing compartment to an inner case, inserting a piston seal into a groove in a seal ring, and expanding the piston seal into an expanded configuration. The method also includes fixing the piston seal in the expanded configuration and positioning the piston seal around a portion of the bearing compartment to allow the piston seal to contact the portion of the bearing compartment.

DETAILED DESCRIPTION

Figure 1:
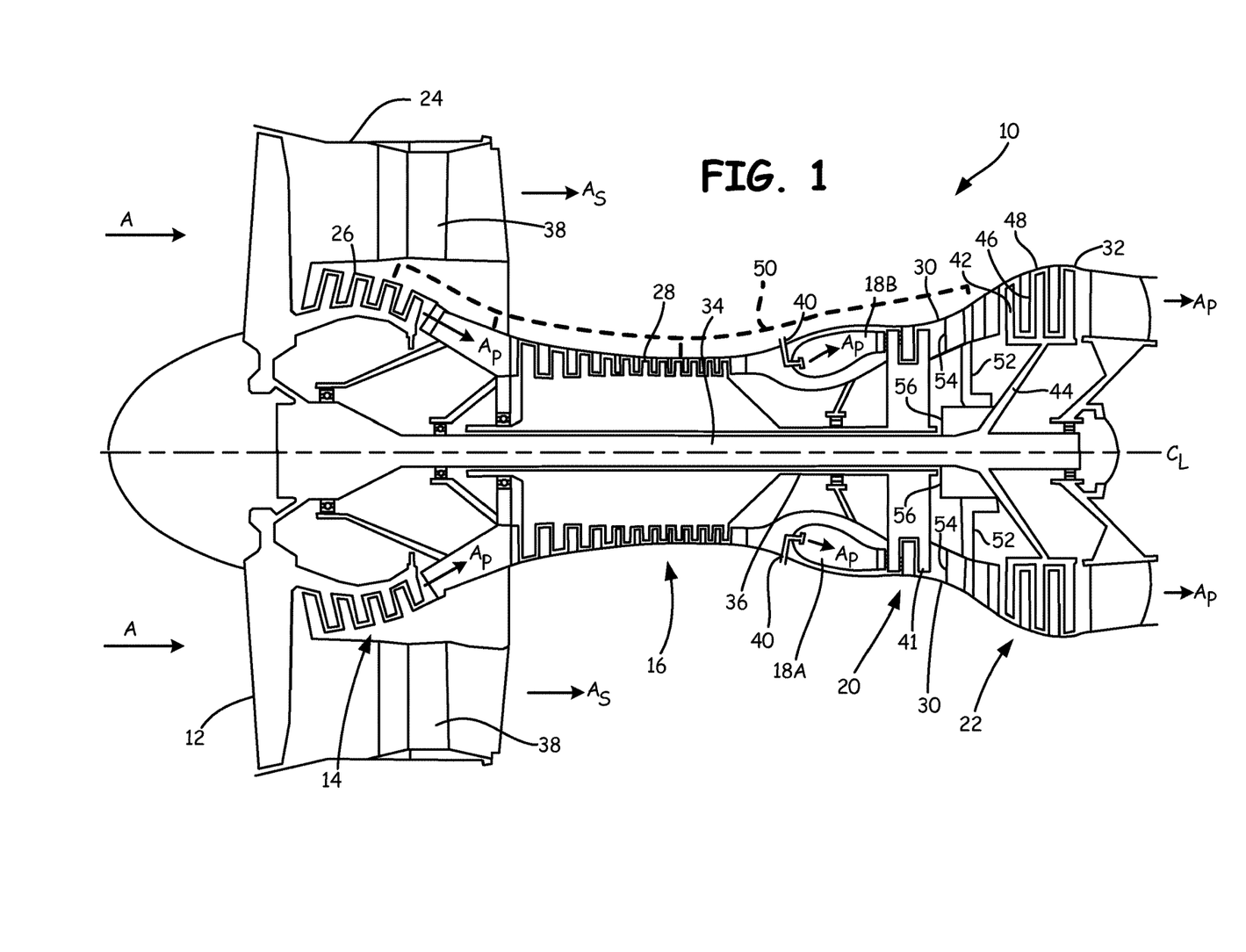
FIG. 1 is a schematic side cross-section view of a gas turbine engine.

In FIG. 1, a cross section of gas turbine engine 10 is shown. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, case section 48, supply line 50, rod 52, mid-turbine frame 54, bearing compartment 56, inlet air A, primary air $A_P$, secondary air $A_S$ (also known as bypass air), and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, low pressure compressor (LPC) 14, high pressure compressor (HPC) 16, combustor section 18, high pressure turbine (HPT) 20, and low pressure turbine (LPT) 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air AP and secondary air AS after passing through fan 12. Fan 12 is rotated by low pressure turbine 22 through low pressure shaft 34 (either directly as shown or through a gearbox, not shown) to accelerate secondary air AS (also known as bypass air) through exit guide vanes 38, thereby producing a major portion of the thrust output of engine 10. Primary air AP (also known as gas path air) is directed first into low pressure compressor 14 and then into high pressure compressor 16. LPC 14 and HPC 16 work together to incrementally step up the pressure of primary air AP. HPC 16 is rotated by HPT 20 through high pressure shaft 36 to provide compressed air to combustor section 18. The compressed air is delivered to combustors 18A-18B, along with fuel through injectors 40, such that a combustion process can be carried out to produce the high energy gases necessary to turn high pressure turbine 20 and low pressure turbine 22. Primary air AP continues through gas turbine engine 10 whereby it is typically passed through an exhaust nozzle to further produce thrust.

After being compressed in LPC 14 and HPC 16 and participating in a combustion process in combustors 18A-18B (FIG. 1) to increase pressure and energy, primary air AP flows through HPT 20 and LPT 22 such that blades 41 and blades 42 extract energy from the flow of primary air AP. Primary air AP impinges on HPT blades 41 to cause rotation of high pressure shaft 36, which turns HPC 16. Primary air AP also impinges on LPT blades 42 to cause rotation of support rotor 44 and low pressure shaft 34, which turns fan 12 and LPC 14.

In addition, a portion of primary air $A_P$ can be bled off from at least one of LPC 14, HPC 16, and in between LPC 14 and HPC 16 through supply line 50. This air is used for cooling components of HPT 20 and LPT 22, so the air travels through supply line 50 into rod 52. Rod 52 is hollow and is a component within mid-turbine frame 54. Mid-turbine frame 54 is a turbine static structure that extends across the flow path of primary air $A_P$. The cooling air is directed through rod 52 to LPT 22 and towards bearing compartment 56. In the illustrated embodiment, bearing compartment 56 contains the number four bearing (i.e. the fourth bearing in from the front of gas turbine engine 10). Therefore, bearing compartment 56 is positioned in between HPT 20 and LPT 22 along longitudinal engine centerline axis $C_L$ such that bearing compartment 56 is proximate HPT 20 and LPT 22.

The components and configuration of gas turbine engine 10 as shown in FIG. 1 allow for a portion of primary air $A_P$ upstream of combustor section 18 to be transported downstream of combustor section 18. Because this air is relatively cool (having not gone through combustor section 18), the air can be used to cool components such as bearing compartment 56. This is advantageous because the temperatures in HPT 20 and LPT 22 would rise to excessively high levels if left unchecked. In addition, this air purges stray oil that has leaked within bearing compartment 56.

Depicted in FIG. 1 is one embodiment of the present invention, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

Figure 2:
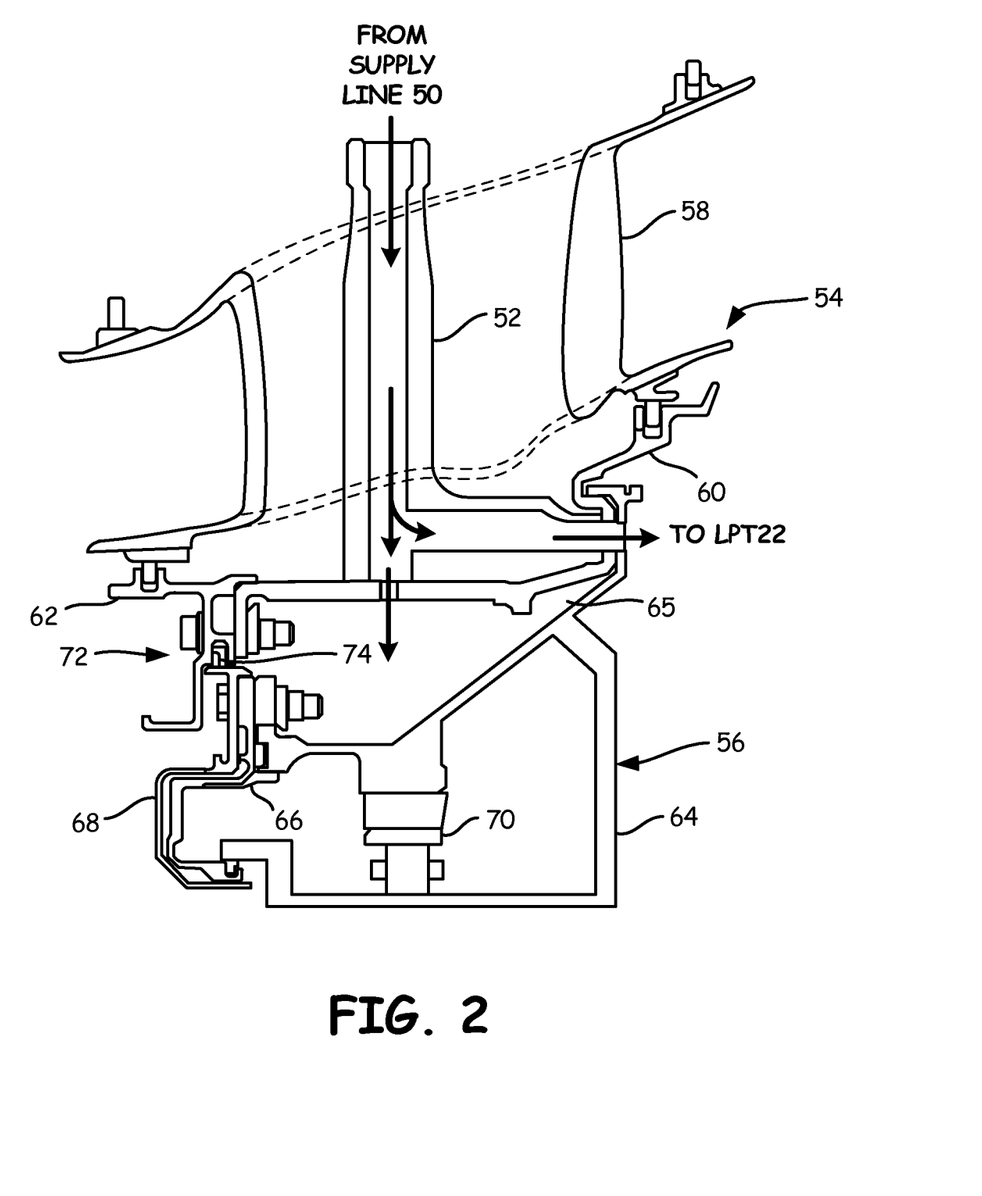
FIG. 2 is a cross-sectional view of a mid-turbine frame and a bearing compartment at the top of the gas turbine engine.

In FIG. 2 a cross-sectional view of mid-turbine frame 54 and bearing compartment 56 is shown at the top of gas turbine engine 10. Mid-turbine frame 54 includes rod 52, fairing 58, inner case 60, and seal ring 62. Bearing compartment 56 includes bearing case 64, seal support 66, heat shield 68, and bearing 70. Also shown in FIG. 2 is sealing arrangement 72 with piston seal 74.

In the illustrated embodiment, fairing 58 is adjacent to inner case 60, and inner case 60 is connected to rod 52 and seal ring 62. Inner case 60 is also connected to bearing compartment 56, specifically to bearing case 64, and cavity 65 exists between inner case 60 and bearing case 64. Bearing case 64 is connected to seal support 66, heat shield 68, and bearing 70. Between heat shield 68 and seal ring 62 is sealing arrangement 72. Sealing arrangement 72 includes piston seal 74 which is positioned between seal ring 62 of mid-turbine frame 54 and heat shield 68 of bearing compartment 56.

During operation of gas turbine engine 10 (shown in FIG. 1), pressurized cooling air comes into rod 52 from supply line 50 (shown in FIG. 1). Most of the cooling air runs through rod 52 and is directed to LPT 22 (shown in FIG. 1). Some of the cooling air is diverted into cavity 65 for cooling of bearing case 64. In addition, this air purges cavity 65 of oil that has accumulated in cavity 65, especially toward the bottom half of gas turbine engine 10 (shown in another embodiment in FIG. 6). The cooling air and oil escapes from cavity 65 past sealing arrangement 72. Sealing arrangement 72 inhibits flow of fluid between mid-turbine frame 54 and cavity 65 by having piston seal 74 configured to contact seal ring 62 and heat shield 68. The amount of sealing provided by sealing arrangement 72 allows for enough flow to properly cool and purge cavity 65, but prevents an undesirably large amount of flow.

Figure 3:
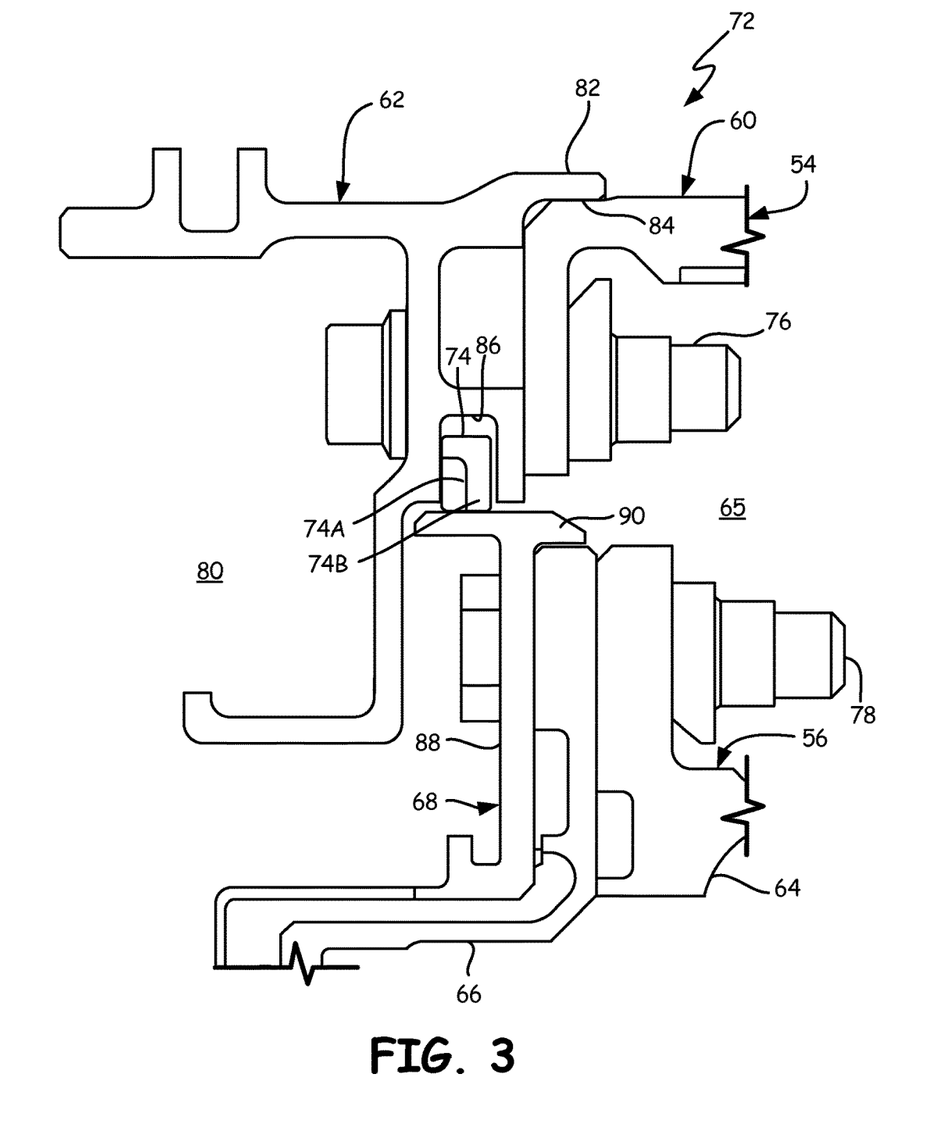
FIG. 3 is a cross-sectional view of a sealing arrangement.

In FIG. 3, a cross-sectional view of sealing arrangement 72 is shown. Shown in FIG. 3 are mid-turbine frame 54 with inner case 60 and seal ring 62; and bearing compartment 56 with bearing case 64, seal support 66, and heat shield 68. Also shown in FIG. 3 are sealing arrangement 72 with piston seal 74, frame fastener 76, and compartment fastener 78.

The region being depicted in FIG. 3 is adjacent HPT 20 (shown in FIG. 1). Therefore, the space bordering mid-turbine frame 54 and bearing compartment 56 on this side is rotor region 80. As shown in FIG. 2, mid-turbine frame 54 is rigidly connected to bearing compartment 56 adjacent LPT 22 (shown in FIG. 1). But mid-turbine frame 54 is not rigidly connected to bearing compartment 56 adjacent rotor region 80. Sealing arrangement 72 is shown in more detail in FIG. 3 and is present between mid-turbine frame 54 and bearing compartment 56. Sealing arrangement 72 inhibits flow of fluid from cavity 65 into rotor region 80. In addition, sealing arrangement 72 inhibits reverse flow of fluid from rotor region 80 into cavity 65.

In the embodiment of FIG. 3, piston ring 74 subtends substantially a complete circle and has a substantially rectangular cross-section with sides configured to contact mid-turbine frame 54 and bearing compartment 56 for sealing. Piston ring 74 is made of a high-temperature alloy such as a nickel or cobalt alloy (ex. Inconel® X-750 from the Special Metals Corporation of New Hartford, N.Y.). Piston ring 74 is not a continuous ring, so there is a joint in piston ring 74. While the joint in piston ring 74 could be a simple butt joint, instead a portion of piston ring 74 is plug 74A that fits into channel 74B. This configuration only exists over a relatively small arc length of piston ring 74, with the majority of piston ring 74 being a solid cylinder. The joint in piston ring 74 allows for adjustability in the diametrical size of piston ring 74, which aids in installation (as discussed later) and allows piston ring 74 to exert diametral tension on heat shield 68.

In the illustrated embodiment, inner case 60 is fastened to seal ring 62 using frame fastener 76. Frame fastener 76 extends axially through inner case 60 and seal ring 62. Seal ring 62 is also connected to inner case 60 by snap rim 82. Snap rim 82 overlaps and snaps onto snap portion 84 of inner case 60. In addition, seal ring 62 includes groove 86 that substantially surrounds the three radially outer sides of piston seal 74. The lateral, opposing sides of groove 86 constrain piston seal 74 axially and the radially outer side of groove 86 restrains piston seal 74 radially. The lateral sides of groove 86 are annular contact surfaces for piston seal 74. To inhibit flow from cavity 65, piston seal 74 contacts the side of groove 86 that is closer to rotor region 80 (as depicted in FIG. 3). To inhibit reverse flow from rotor region 80, piston seal 74 slides laterally over axial portion 90 due to the pressure differential across sealing arrangement 72. The result is that piston seal 74 contacts the opposite side of groove 86, which is the side that is closer to cavity 65 (this configuration is not depicted in FIG. 3).

In the illustrated embodiment, seal support 66 and heat shield 68 are fastened to bearing case 64 using compartment fastener 78. Compartment fastener 78 extends axially through bearing case 64, seal support 66, and heat shield 68. Heat shield 68 includes radial portion 88 and axial portion 90. Compartment fastener 78 extends through radial portion 88, and axial portion 90 is a rim that attached at the radially outer side of radial portion 88. Axial portion 90 extends beyond both sides of radial portion 88 such that one side is positioned over seal support 66. The radial outer side of axial portion 90 is a cylindrical surface that piston seal 74 is configured to contact and restrains piston seal 74 radially. Due to the configuration of piston ring 74, the contact surface of axial portion 90 is substantially perpendicular to the contact surfaces of groove 86.

In order to assemble sealing arrangement 72, bearing compartment 56 is assembled by fastening bearing case 64, seal support 66, and heat shield 68 together. In addition, most of mid-turbine frame 54 is assembled, such as rod 52 (shown in FIG. 2) and inner case 60, without seal ring 62. Then bearing compartment 56 and the partial mid-turbine frame 54 are connected. Meanwhile, piston seal 74 is positioned in groove 86. The uninstalled configuration of piston seal 74 has an inner diameter that is smaller than the outer diameter of axial portion 90. Piston seal 74 is then expanded to an expanded configuration having an inner diameter that is larger than the outer diameter of axial portion 90. Piston seal 74 is fixed in this expanded configuration using, for example, adhesive in the joint of piston seal 74, adjacent plug 74A and channel 74B. Seal ring 62 is then snapped onto and fastened to inner case 60 such that piston seal 74 surrounds heat shield 68. Piston seal 74 is then unfixed from the expanded configuration, allowing piston seal 74 to contact axial portion 90. Piston seal 74 grips on to axial portion 90 due to diametic tension, although piston seal 74 is slidably movable along axial portion 90. This unfixing includes the removal of the adhesive in the joint, for example, using chemicals and/or heat (including heat applied by operating gas turbine engine 10, shown in FIG. 1).

The components and configuration of sealing arrangement 72 as shown in FIG. 3 allow for piston seal 74 to be positioned between mid-turbine frame 54 and bearing compartment 56. Using piston seal 74 is advantageous because piston seals have significantly more mass than some other types of seals, for example, w-seals. Therefore piston seals provide thermal resistance and protection to components that are adjacent rotor region 80. In addition, piston seal 74 allows for some cooling air to transport stray oil out of cavity 65.

Depicted in FIG. 3 is one embodiment of the present invention, to which there are alternative embodiments. For example, piston seal 74 can be adapted to allow virtually no flow through sealing arrangement 72. In such an embodiment, purging of bearing compartment 56 would be minimized.

Figure 4:
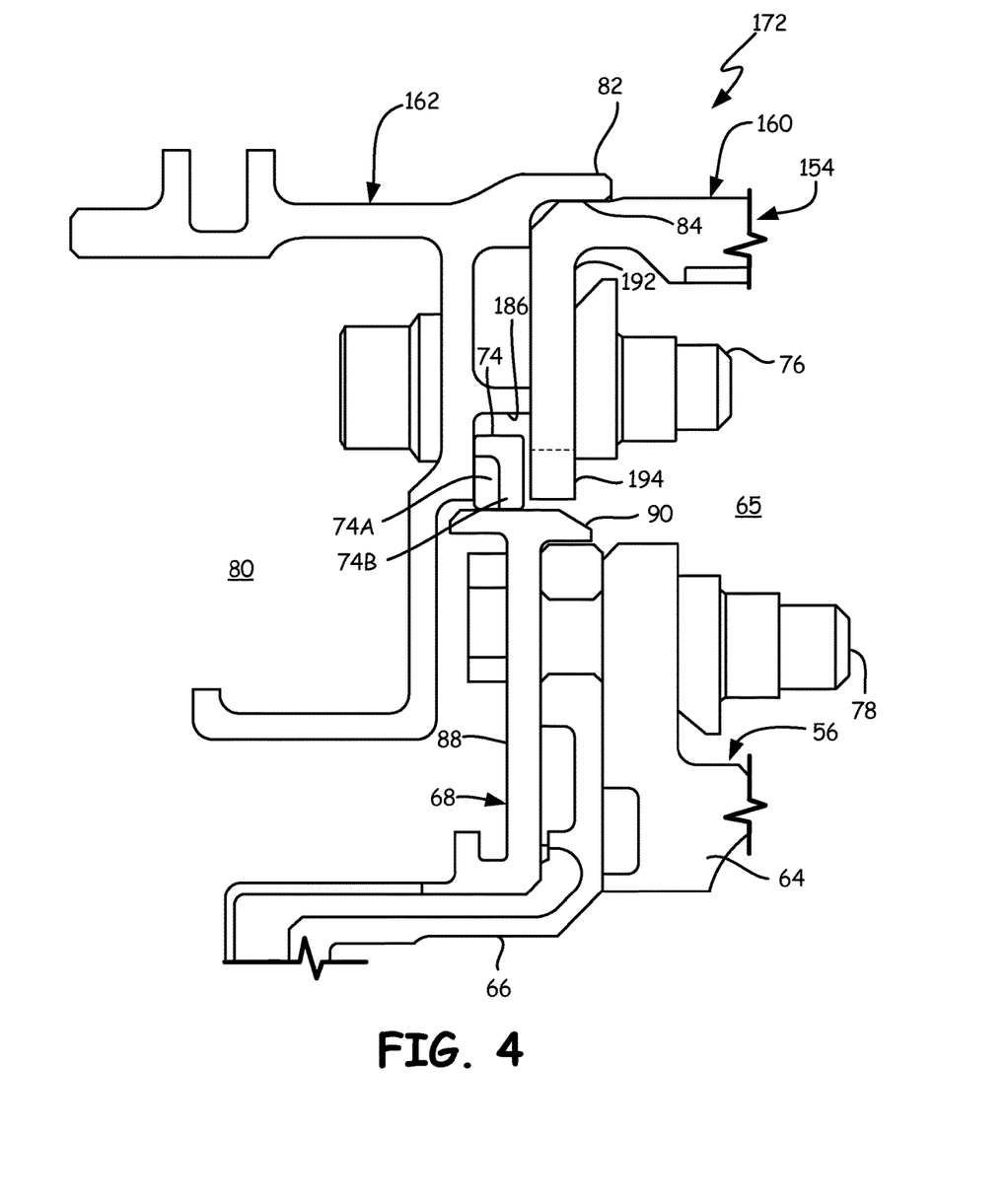
FIG. 4 is a cross-sectional view of an alternate embodiment sealing arrangement.

In FIG. 4, a cross-sectional view of an alternate embodiment sealing arrangement 172 is shown. Sealing arrangement 172 shares some of the components with sealing arrangement 72, such as bearing compartment 56 and piston seal 74, but has other components that are different, such as mid-turbine frame 154. In general, piston seal 74 is positioned between and is configured to contact sealing ring 162, inner case 160, and heat shield 68.

In the illustrated embodiment, mid-turbine frame 154 includes inner case 160 and seal ring 162. Inner case 160 includes flange 192 that extends radially inward from snap portion 84. While flange 192 could have a plain cylindrical shape, flange 192 has a scalloped radially inner end comprised of a plurality of fingers 194. Flange 192 axially constrains piston seal 74 and is the lateral annular contact surface that piston seal 74 is configured to contact in order to inhibit reverse flow (this configuration is not depicted in FIG. 4). Seal ring 162 includes rabbet 186 which axially and radially constrains piston seal 74. Rabbet 186 also serves as the lateral annular contact surface that piston seal 74 is configured to contact in order to inhibit normal flow (as depicted in FIG. 4) out of cavity 56. Due to the configuration of piston ring 74, the lateral contact surfaces of flange 192 and rabbet 186 are substantially perpendicular to the cylindrical contact surface of axial portion 90.

In order to assemble sealing arrangement 172, bearing compartment 56 is assembled by fastening bearing case 64, seal support 66, and heat shield 68 together. In addition, most of mid-turbine frame 154 is assembled, such as rod 52 (shown in FIG. 2) and inner case 160, without seal ring 162. Then bearing compartment 56 and the partial mid-turbine frame 154 are connected. The uninstalled configuration of piston seal 74 has an inner diameter that is smaller than the outer diameter of axial portion 90. Therefore, piston seal 74 is expanded into an expanded configuration with an inner diameter that is larger than the outer diameter of axial portion 90. Piston seal 74 is positioned over heat shield 68 and allowed to contract in order to be in contact with axial portion 90. Piston seal 74 grips on to axial portion 90 due to diametic tension, although piston seal 74 is slidably movable along axial portion 90. Seal ring 162 is then snapped onto and fastened to inner case 160.

The components and configuration of sealing arrangement 172 as shown in FIG. 4 allow for piston seal 74 to be positioned between mid-turbine frame 154 and bearing compartment 56. Furthermore, assembly and disassembly of sealing arrangement 172 is relatively simpler and more reliable (as discussed further below). Also, there is much broader access to the contact surfaces on mid-turbine frame 154 and bearing compartment 56 for inspection and repair purposes.

Figure 5:
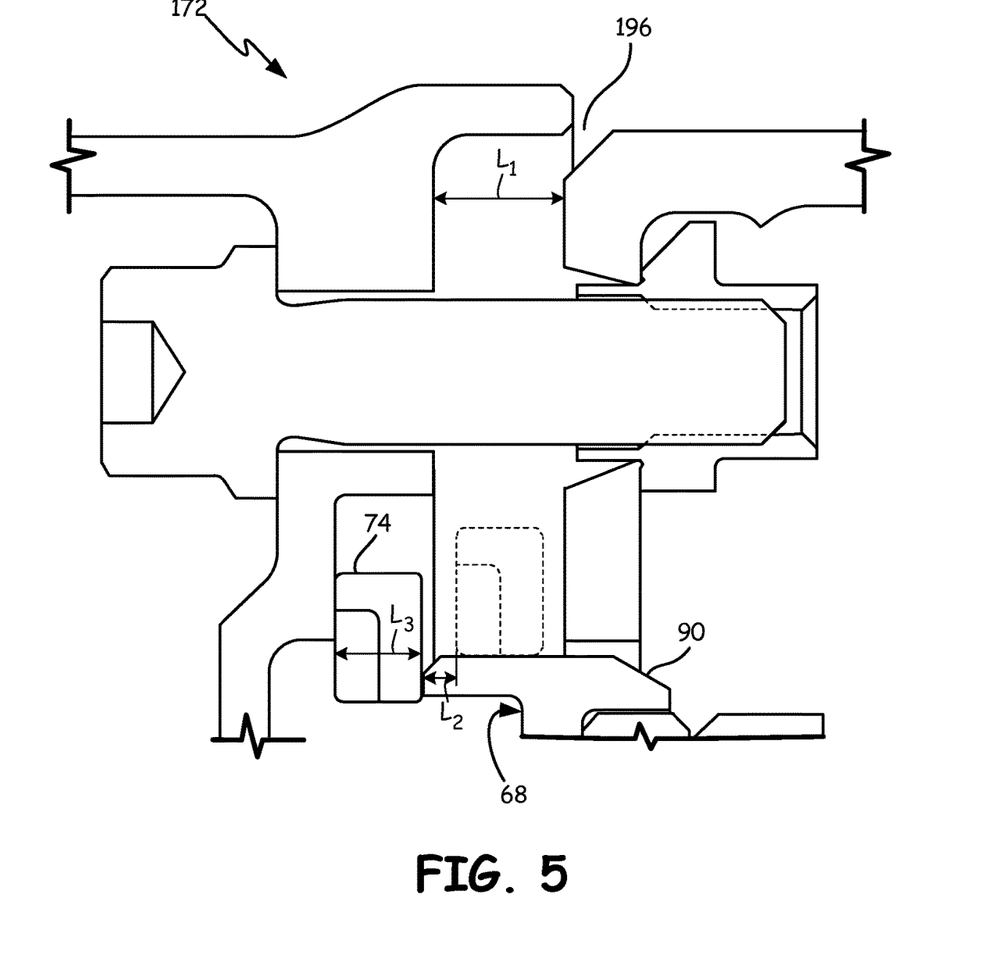
FIG. 5 is a cross-sectional view of an incorrectly assembled sealing arrangement.

In FIG. 5, a cross-sectional view of an incorrectly assembled sealing arrangement 172 is shown. More specifically, piston ring 74 has not been properly expanded and fit onto heat shield 68 prior to fastening seal ring 162 to inner case 160. The components and configuration of sealing arrangement 172 provides an instantly visible indication of incorrect assembly due to gap 196 between seal ring 162 and inner case 160. Gap 196 exists because of the relative axial lengths of three of the components of sealing arrangement 172. Length $L_1$ is the length of snap rim 82 that overlaps snap portion 84. Length $L_2$ is the length of axial portion 90 that extends beyond piston seal 74, or, in other words, length $L_2$ is the distance from the end of axial portion 90 to the proximal side of piston seal 74 when piston seal 74 is in the normal sealing position (shown in phantom). Length $L_3$ is the width of piston seal 74. Gap 196 exists because length $L_1$ is shorter than length $L_2$ added to length $L_3$.

Figure 6:
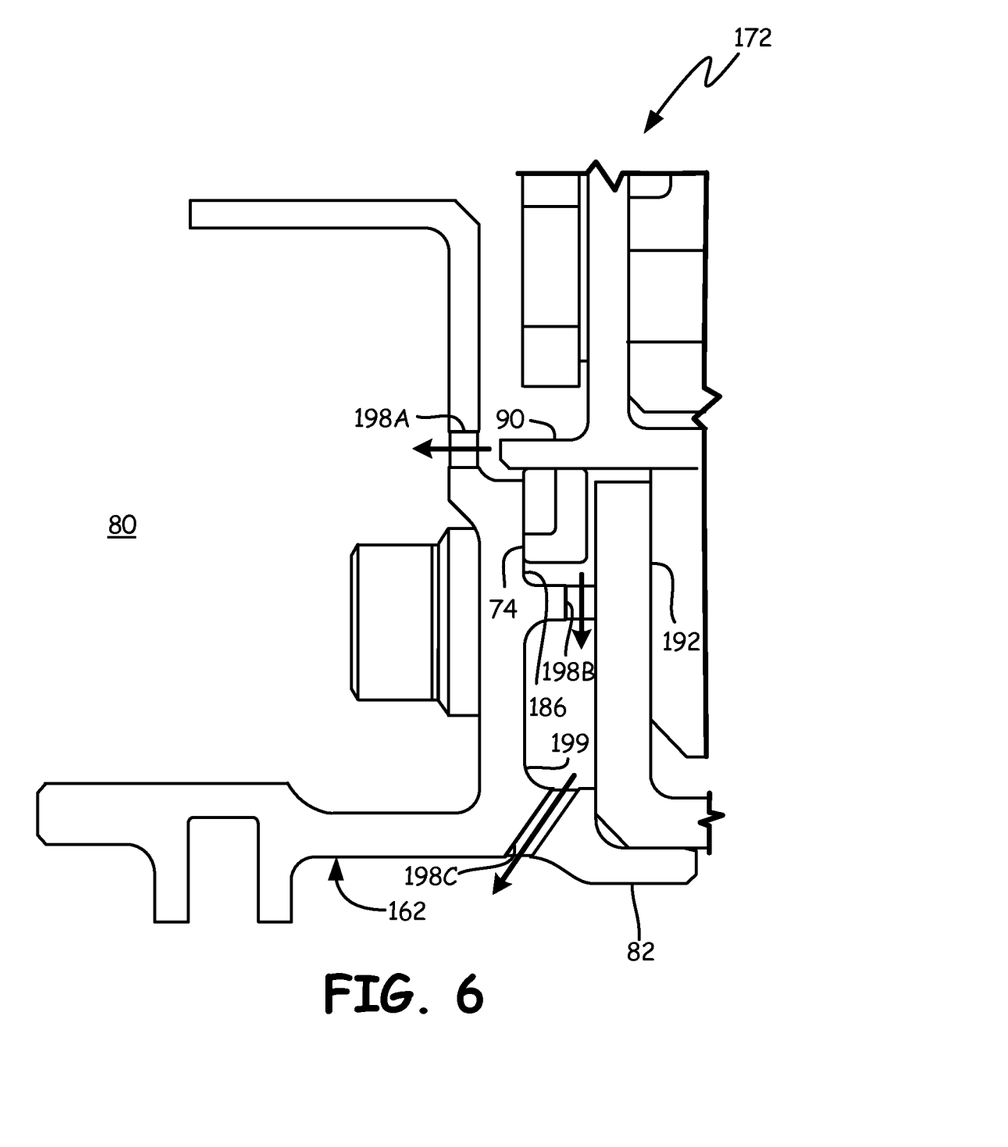
FIG. 6 is a cross-sectional view of a sealing arrangement with drain pathways at the bottom of the gas turbine engine.

In FIG. 6, a cross-sectional view of sealing arrangement 172 is shown at the bottom of gas turbine engine 10. At this location of sealing arrangement 172, drain pathway 198A extends axially through seal ring 162 proximate axial portion 90. Drain pathway 198B extends radially through seal ring 162 from rabbet 186 into pocket 199. Drain pathway 198C extends through the radially outer portion of seal ring 162 at an angle from pocket 199 proximate snap rim 82.

Drain pathways 198A, 198B, and 198C allow for cooling air to purge stray oil that has collected around sealing arrangement 172. More specifically, drain pathway 198A allows oil to be blown out into rotor region 80 by cooling air passing by piston seal 74. In addition, oil that has accumulated between rabbet 186 and flange 192 is blown out through drain pathway 198B, pocket 199, and drain pathway 198C.

Figure 7:
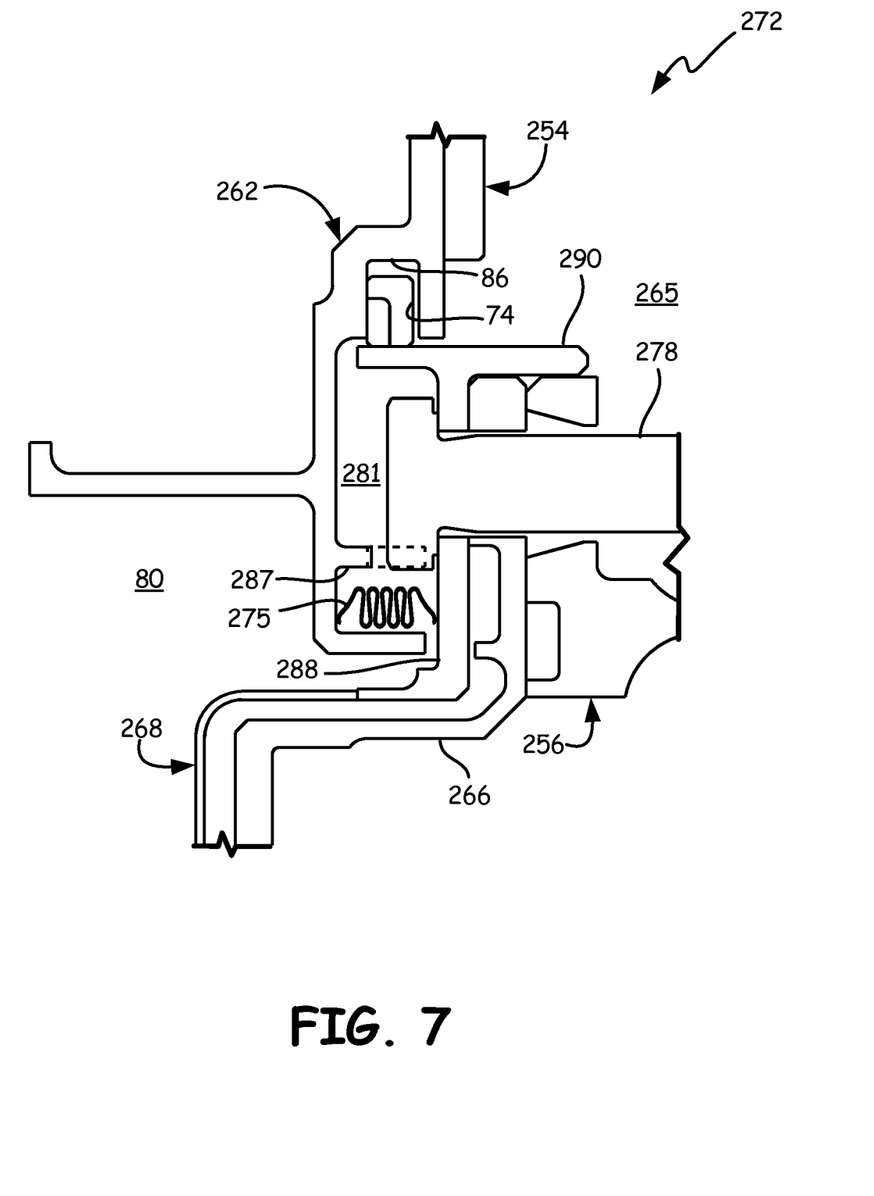
FIG. 7 is a cross-sectional view of an alternate embodiment sealing arrangement.

In FIG. 7, a cross-sectional view of an alternate embodiment sealing arrangement 272 is shown. In general, sealing arrangement 272 shares the position of piston seal 74 with sealing arrangements 72 and 172, but further includes second seal 275. The addition of second seal 275 requires some differently-configured components from that of sealing arrangements 72 and 172.

In the illustrated embodiment, second seal 275 is a w-seal that is formed from a sheet of a high-temperature alloy, such as a nickel or cobalt alloy, which has been folded several times. W-seals are generally cheaper than piston seals and also seal better due to their ability to be installed in compression. Second seal 275 is positioned between mid-turbine frame 254 and bearing compartment 256. More specifically, second seal 275 is configured to contact the radially-extending annular side of second groove 287 in seal ring 262 on one end and an annular area of radial portion 288 of heat shield 268 on the other end. These two contact surfaces on second groove 287 and radial portion 288 are substantially parallel to each other and are distal from the contact surfaces for piston seal 74 (i.e. groove 86 and axial portion 290).

The region between seal ring 262 and heat shield 268 that is bordered by piston seal 74 and second seal 275 is fastener compartment 281. Therefore, there is a leakage flowpath for cooling air that starts in cavity 265, goes past piston seal 74, and into fastener compartment 281. This flowpath continues past second seal 275 and into rotor region 80.

In the illustrated embodiment, second seal 275 is positioned directly radially inwardly of piston seal 74 at the same position along longitudinal engine centerline axis $C_L$ (shown in FIG. 1) on opposite sides of compartment fastener 278. But second seal 275 is positioned in series with piston seal 74, downstream along the leakage flowpath from piston seal 74 during normal flow. In the case of reverse flow, second seal 275 is positioned upstream of piston seal 74 along the leakage flowpath. In order to better prevent reverse flow, second seal 275 is oriented such that reverse flow tends to force second seal 275 against second groove 287 and radial portion 288 more than in the case of normal flow.

The components and configuration of sealing arrangement 272 as shown in FIG. 7 allow for a cheap and efficient w-seal to be employed (i.e. second seal 275) that is protected by piston seal 74. In addition, sealing arrangement 272 can be better configured to inhibit reverse flow from rotor region 80 into cavity 265.

Depicted in FIG. 7 is one embodiment of the present invention, to which there are alternative embodiments. For example, second seal 275 can be oriented to better prevent normal flow by reversing its orientation. For another example, both piston seal 74 and second seal 275 can be piston seals. In such an embodiment, second seal 275 would be configured to contact the annular surface of the radially inner side of second groove 287 for inhibiting normal flow and the annular surface of the radially outer side of second groove 287 for inhibiting reverse flow. Alternatively, both piston seal 74 and second seal 275 can be w-seals in any combination of orientations. For a further example, piston seal 74 can be constrained by the configuration of sealing arrangement 172 (shown in FIG. 4).

Discussion of Possible Embodiments

The following are non-exclusive descriptions of possible embodiments of the present invention.

A sealing arrangement according to an exemplary embodiment of this disclosure, among other possible things includes: a turbine static structure having a seal ring with groove, the groove having a first contact surface; a bearing compartment that is surrounded by the turbine static structure having a second contact surface; and a piston seal positioned between the turbine static structure and the bearing compartment, the piston seal comprising: a first side configured to contact the first contact surface; and a second side configured to contact the second contact surface; wherein the piston seal is positioned in the groove such that the groove substantially surrounds the first side, a third side, and a fourth side of the piston seal.

The sealing arrangement of the preceding paragraph can optionally include, additionally and/or alternatively, any one or more of the following features, configurations and/or additional components:

A further embodiment of the foregoing sealing arrangement, wherein the first contact surface can be positioned on a first groove side, and the sealing arrangement further can further comprise: a third contact surface on a second groove side of the groove; wherein the third side of the piston seal can be configured to contact the third contact surface for reverse flow sealing.

A further embodiment of any of the foregoing sealing arrangements, wherein the first contact surface can be an annular surface.

A further embodiment of any of the foregoing sealing arrangements, wherein the seal ring can be fastened to the turbine static structure.

A further embodiment of any of the foregoing sealing arrangements, wherein the first contact surface can be substantially perpendicular to the second contact surface.

A further embodiment of any of the foregoing sealing arrangements, wherein the second contact surface can be on a heat shield for the bearing compartment.

A further embodiment of any of the foregoing sealing arrangements, wherein the second contact surface can be a cylindrical surface.

A further embodiment of any of the foregoing sealing arrangements, wherein the seal ring can have an uninstalled inner diameter that is smaller than an outer diameter of the second contact surface.

A gas turbine engine arranged along an axis according to an exemplary embodiment of this disclosure, among other possible things includes: a fan; a first compressor downstream of the fan; a second compressor downstream of the first compressor; a combustor downstream of the second compressor; a first turbine downstream of the combustor; a second turbine downstream of the first turbine; a turbine static structure proximate at least one of the first turbine and the second turbine, the turbine static structure having a seal ring with groove; a bearing compartment connected to the turbine static structure; and a piston seal positioned in the groove of the turbine static structure such that the piston seal is configured to contact the turbine static structure and the bearing compartment during operation of the gas turbine engine.

The gas turbine engine of the preceding paragraph can optionally include, additionally and/or alternatively, any one or more of the following features, configurations and/or additional components:

A further embodiment of the foregoing gas turbine engine, wherein the piston seal can be constrained axially by the groove and constrained radially by the groove and the bearing compartment.

A further embodiment of any of the foregoing gas turbine engines, wherein the turbine static structure can be positioned downstream of the first turbine and upstream of the second turbine.

A further embodiment of any of the foregoing gas turbine engines, wherein the bearing compartment can include the fourth bearing of the gas turbine engine.

A further embodiment of any of the foregoing gas turbine engines, wherein the turbine static structure can further comprise: a gas tube; a fairing surrounding the gas tube; and an inner case connected to the gas tube and the seal ring.

A further embodiment of any of the foregoing gas turbine engines, wherein the piston seal can be configured to contact an annular portion of the groove and a cylindrical portion of the bearing compartment for sealing during operation of the gas turbine engine.

A further embodiment of any of the foregoing gas turbine engines, wherein the seal ring can have an uninstalled inner diameter that is smaller than an outer diameter of the second contact surface.

A method of assembling a gas turbine engine according to an exemplary embodiment of this disclosure, among other possible things includes: connecting a bearing compartment to an inner case; inserting a piston seal into a groove in a seal ring; expanding the piston seal into an expanded configuration; fixing the piston seal in the expanded configuration; positioning the piston seal around a portion of the bearing compartment to allow the piston seal to contact the portion of the bearing compartment.

The method of the preceding paragraph can optionally include, additionally and/or alternatively, any one or more of the following steps, features, configurations and/or additional components:

A further embodiment of the foregoing method, wherein the method can further comprise: fastening the seal ring to the inner case.

A further embodiment of any of the foregoing methods, wherein the portion of the bearing compartment can be a heat shield.

A further embodiment of any of the foregoing methods, wherein positioning the seal ring can comprise: moving the seal ring along an engine axis until the piston seal is positioned around the portion of the bearing compartment.

A further embodiment of any of the foregoing methods, wherein fixing the piston seal in the expanded configuration can comprise: applying adhesive to a joint in the piston seal.

Although the present invention has been described with reference to preferred embodiments, workers skilled in the art will recognize that changes may be made in form and detail without departing from the spirit and scope of the invention.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sealing arrangement comprising:
   a turbine static structure having a seal ring with a groove, the groove having a first contact surface;
   a bearing compartment that is surrounded by the turbine static structure, the bearing compartment comprising:
      a bearing;
      a bearing casing connected to the bearing;
      a heat shield; and
      a seal support disposed between the heat shield and the bearing casing, wherein the heat shield has a second contact surface, and wherein the heat shield and the seal support are connected to the bearing casing; and
   a piston seal positioned between the turbine static structure and the heat shield, the piston seal comprising:
      a first side configured to contact the first contact surface; and
      a second side configured to contact the second contact surface; and
      a joint formed by circumferentially opposed ends of the piston seal;
      wherein the piston seal is positioned in the groove such that the groove substantially surrounds the first side, a third side, and a fourth side of the piston seal;
      wherein the joint permits the second side of the piston seal to have an uninstalled inner diameter that is smaller than an outer diameter of the second contact surface.

2. The sealing arrangement of claim 1, wherein the first contact surface is positioned on a first groove side, the sealing arrangement further comprising:
   a third contact surface on a second groove side of the groove;
   wherein the third side of the piston seal is configured to contact the third contact surface for reverse flow sealing.

3. The sealing arrangement of claim 1, wherein the first contact surface is an annular surface.

4. The sealing arrangement of claim 1, wherein the seal ring is fastened to the turbine static structure.

5. The sealing arrangement of claim 1, wherein the first contact surface is substantially perpendicular to the second contact surface.

6. The sealing arrangement of claim 1, wherein the second contact surface is a cylindrical surface.

7. The sealing arrangement of claim 1, wherein the seal ring includes a passage extending radially outward through the seal ring from the groove.

8. A gas turbine engine arranged along an axis, the gas turbine engine comprising:
   a fan;
   a first compressor downstream of the fan;

a second compressor downstream of the first compressor;
a combustor downstream of the second compressor;
a first turbine downstream of the combustor;
a second turbine downstream of the first turbine;
a turbine static structure proximate at least one of the first turbine and the second turbine, the turbine static structure having a seal ring with a groove having a first contact surface;
a bearing compartment connected to the turbine static structure and surrounded by the turbine static structure, the bearing compartment comprising:
   a bearing;
   a bearing casing connected to the bearing;
   a heat shield; and
   a seal support disposed between the heat shield and the bearing casing, wherein the heat shield has a second contact surface, and wherein the heat shield and the seal support are connected to the bearing casing; and
a piston seal positioned in the groove of the turbine static structure such that a first side of the piston seal is configured to contact the first contact surface of the turbine static structure during operation of the gas turbine engine, a second side of the piston seal is configured to contact the second contact surface of the heat shield during operation of the gas turbine engine, wherein the groove substantially surrounds the first side, a third side, and a fourth side of the piston seal, and wherein the piston seal includes a joint formed by circumferentially opposed ends of the piston seal that permits the second side of the piston seal to have an uninstalled inner diameter that is smaller than an outer diameter of the second contact surface.

9. The gas turbine engine of claim 8, wherein the piston seal is constrained axially by the groove and constrained radially by the groove and the bearing compartment.

10. The gas turbine engine of claim 8, wherein the turbine static structure is positioned downstream of the first turbine and upstream of the second turbine.

11. The gas turbine engine of claim 8, wherein the gas turbine engine includes a first bearing, a second bearing, a third bearing, and a fourth bearing arranged in sequential order from a front of the gas turbine engine, and wherein the bearing compartment includes the fourth bearing of the gas turbine engine.

12. The gas turbine engine of claim 8, wherein the turbine static structure further comprises:
   a gas tube;
   a fairing surrounding the gas tube; and
   an inner case connected to the gas tube and the seal ring.

13. The gas turbine engine of claim 8, wherein the piston seal is configured to contact an annular portion of the groove and a cylindrical portion of the bearing compartment for sealing during operation of the gas turbine engine.

14. A method of assembling a gas turbine engine, the method comprising:
   connecting a bearing compartment to an inner case;
   inserting a piston seal into a groove in a seal ring of a turbine static structure such that a first side of the piston seal contacts a first contact surface on a first side of the groove and the groove substantially surrounds the first side, a third side, and a fourth side of the piston seal;
   expanding the piston seal from an uninstalled configuration into an expanded configuration at a joint formed by circumferentially opposed ends of the piston seal;
   fixing the piston seal in the expanded configuration;
   positioning an inner diameter of a second side of the piston seal around an outer diameter of a second contact surface of a heat shield connected to a bearing case of the bearing compartment to allow the second side of the piston seal to contact the second contact surface of the bearing compartment, wherein the inner diameter of the second side of the piston seal is smaller than the outer diameter of the second contact surface in the uninstalled configuration, and wherein a seal support is disposed between the heat shield and the bearing case and is connected to the bearing case.

15. The method of claim 14, and further comprising:
   fastening the seal ring to the inner case.

16. The method of claim 14, wherein positioning the piston seal comprises:
   moving the seal ring along an engine axis until the piston seal is positioned around the second contact surface of the bearing compartment.

17. The method of claim 14, wherein fixing the piston seal in the expanded configuration comprises:
   applying adhesive to a joint in the piston seal.

* * * * *